(12) United States Patent
Pelaez

(10) Patent No.: US 12,451,023 B2
(45) Date of Patent: Oct. 21, 2025

(54) EDUCATION SUPPORT APPARATUS, COMMUNICATION SYSTEM, NON-TRANSITORY COMPUTER READABLE MEDIUM, AND EDUCATION SUPPORT METHOD

(71) Applicant: TOYOTA JIDOSHA KABUSHIKI KAISHA, Toyota (JP)

(72) Inventor: Jorge Pelaez, Kawaguchi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/336,982

(22) Filed: Jun. 17, 2023

(65) Prior Publication Data
US 2023/0410675 A1    Dec. 21, 2023

(30) Foreign Application Priority Data
Jun. 20, 2022   (JP) .................. 2022-099114

(51) Int. Cl.
G09B 5/14     (2006.01)
G09B 5/06     (2006.01)
H04L 67/12    (2022.01)

(52) U.S. Cl.
CPC ............. *G09B 5/14* (2013.01); *G09B 5/065* (2013.01); *H04L 67/12* (2013.01)

(58) Field of Classification Search
CPC ........... G09B 5/14; G09B 5/065; H04L 67/12
See application file for complete search history.

(56) References Cited

U.S. PATENT DOCUMENTS

| 5,537,141 | A | * | 7/1996 | Harper | H04N 21/4758 348/E7.071 |
| 5,682,196 | A | * | 10/1997 | Freeman | H04N 7/17318 348/E7.071 |
| 5,695,346 | A | * | 12/1997 | Sekiguchi | G09B 5/00 434/96 |

(Continued)

FOREIGN PATENT DOCUMENTS

| JP | 2001-337589 A | 12/2001 |
| JP | 2002-169901 A | 6/2002 |

(Continued)

*Primary Examiner* — Xuan M Thai
*Assistant Examiner* — Sadaruz Zaman
(74) *Attorney, Agent, or Firm* — Finnegan, Henderson, Farabow, Garrett and Dunner. LLP

(57) ABSTRACT

An education support apparatus, which is configured to support online education conducted by connecting, via a network, respective terminal apparatuses used by an instructor and a plurality of students who are present in spaces separate from each other, includes a communication interface configured to communicate via the network, and a controller configured to receive, via the communication interface, a plurality of individual images including an image of the instructor and an image of a second student different from a first student among the plurality of students, generate, using the received plurality of individual images, a composite image representing the second student as being present in the same space as the instructor, and control a terminal apparatus used by the first student to display the generated composite image.

7 Claims, 14 Drawing Sheets

(56) References Cited

U.S. PATENT DOCUMENTS

| | | | | |
|---|---|---|---|---|
| 5,716,273 | A * | 2/1998 | Yuen | A63F 13/792 |
| | | | | 348/E7.075 |
| 5,951,300 | A * | 9/1999 | Brown | H04L 67/289 |
| | | | | 434/262 |
| 7,214,065 | B2 * | 5/2007 | Fitzsimmons, Jr. | G09B 19/00 |
| | | | | 434/236 |
| 8,984,061 | B2 * | 3/2015 | Inoue | G09G 5/14 |
| | | | | 704/214 |
| 9,854,112 | B2 * | 12/2017 | Saito | H04N 1/00482 |
| 10,515,561 | B1 * | 12/2019 | Fieldman | G09B 7/00 |
| 11,069,251 | B1 * | 7/2021 | Roeder | H04L 67/125 |
| 11,321,764 | B2 * | 5/2022 | Kishi | G09B 5/00 |
| 11,603,093 | B2 * | 3/2023 | Kamaga | B60W 60/0015 |
| 11,638,853 | B2 * | 5/2023 | Yang | G06V 40/23 |
| | | | | 434/247 |
| 11,699,353 | B2 * | 7/2023 | Jackson | G06Q 30/04 |
| | | | | 434/169 |
| 2004/0157195 | A1 * | 8/2004 | Andresen | A63F 9/10 |
| | | | | 434/130 |
| 2008/0248455 | A1 * | 10/2008 | Dohrmann | G09B 5/12 |
| | | | | 434/365 |
| 2015/0127340 | A1 * | 5/2015 | Epshteyn | G10L 21/00 |
| | | | | 704/235 |
| 2016/0314717 | A1 * | 10/2016 | Grubbs | G09B 23/306 |
| 2021/0385263 | A1 | 12/2021 | Churchill | |
| 2022/0327952 | A1 * | 10/2022 | Song | A61B 5/4803 |
| 2022/0383771 | A1 * | 12/2022 | Alexander | G09B 5/065 |
| 2023/0410675 | A1 * | 12/2023 | Pelaez | G09B 5/14 |
| 2024/0169539 | A1 * | 5/2024 | Yamazaki | A61B 5/163 |

FOREIGN PATENT DOCUMENTS

| | | |
|---|---|---|
| JP | 2021-110782 A | 8/2021 |
| JP | 2021-110957 A | 8/2021 |
| JP | 2022-049606 A | 3/2022 |

* cited by examiner

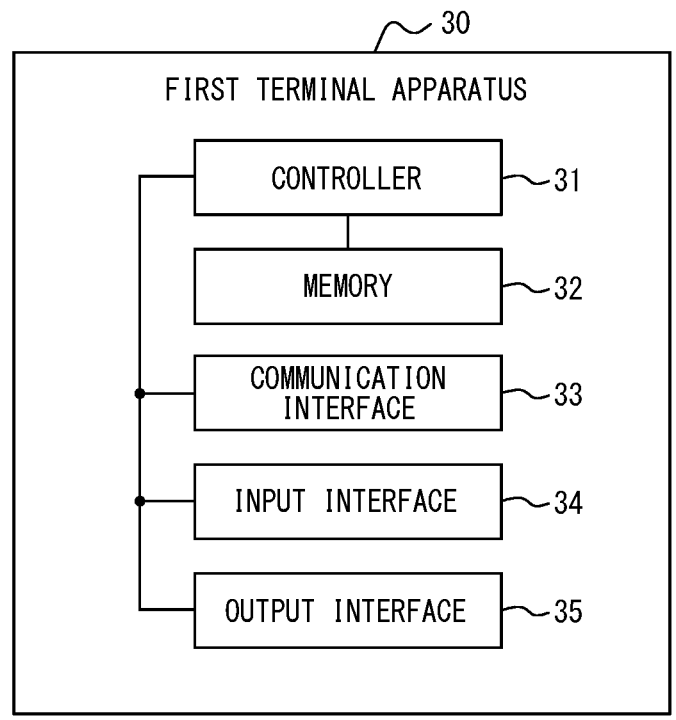
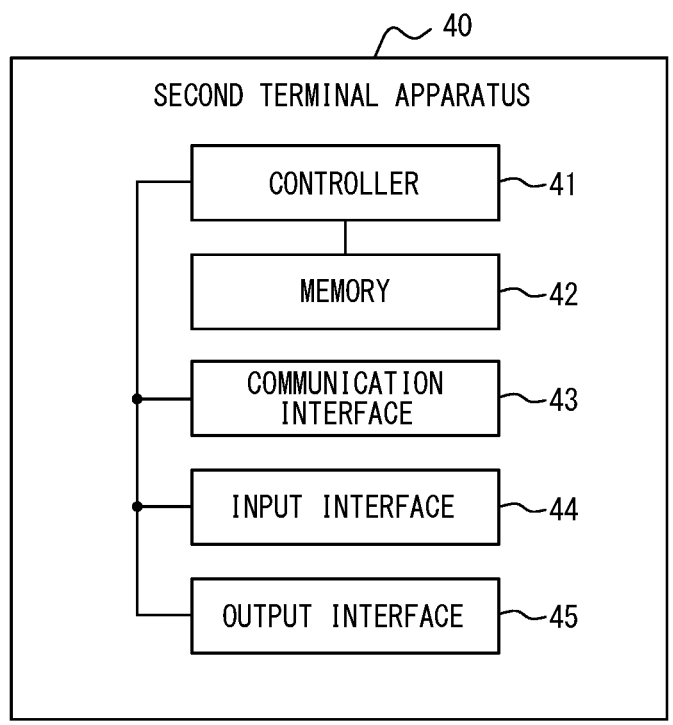

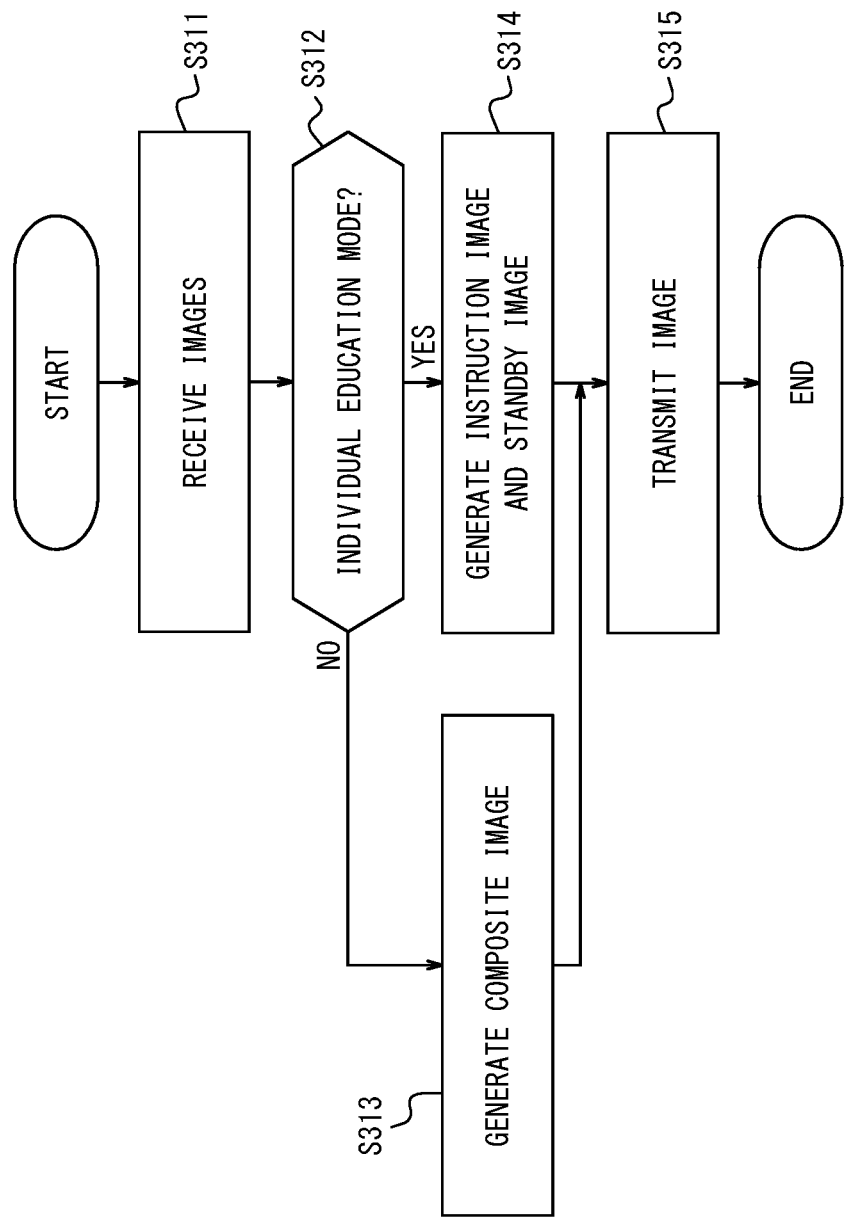

EDUCATION SUPPORT APPARATUS, COMMUNICATION SYSTEM, NON-TRANSITORY COMPUTER READABLE MEDIUM, AND EDUCATION SUPPORT METHOD

CROSS-REFERENCE TO RELATED APPLICATION

This application claims priority to Japanese Patent Application No. 2022-099114 filed on Jun. 20, 2022, the entire contents of which are incorporated herein by reference.

TECHNICAL FIELD

The present disclosure relates to an education support apparatus, a communication system, a program, and an education support method.

BACKGROUND

Patent Literature (PTL) 1 discloses an education assist apparatus that assists an instructor in teaching remote students using screens displayed by computers.

CITATION LIST

Patent Literature

PTL 1: JP 2021-110782 A

SUMMARY

The conventional apparatus displays, on terminals operated by students, not student video screens but only an instructor video screen. This makes it difficult for the students to have the feel of being receiving instruction by an instructor together with other students. In other words, the students cannot realize the feel of being receiving group education.

It would be helpful to let students realize the feel of being receiving group education.

An education support apparatus according to the present disclosure is an education support apparatus configured to support online education conducted by connecting, via a network, respective terminal apparatuses used by an instructor and a plurality of students who are present in spaces separate from each other, the education support apparatus including:
 a communication interface configured to communicate via the network; and
 a controller configured to:
  receive, via the communication interface, a plurality of individual images including an image of the instructor and an image of a second student different from a first student among the plurality of students;
  generate, using the received plurality of individual images, a composite image representing the second student as being present in the same space as the instructor; and
  control a terminal apparatus used by the first student to display the generated composite image.

A program according to the present disclosure is configured to cause a computer to execute operations, the computer being configured to support online education conducted by connecting, via a network, respective terminal apparatuses used by an instructor and a plurality of students who are present in spaces separate from each other, the operations including:
 receiving, via the network, a plurality of individual images including an image of the instructor and an image of a second student different from a first student among the plurality of students;
 generating, using the received plurality of individual images, a composite image representing the second student as being present in the same space as the instructor; and
 controlling a terminal apparatus used by the first student to display the generated composite image.

An education support method according to the present disclosure is an education support method to support online education conducted by connecting, via a network, respective terminal apparatuses used by an instructor and a plurality of students who are present in spaces separate from each other, the education support method including:
 receiving, via the network, a plurality of individual images including an image of the instructor and an image of a second student different from a first student among the plurality of students;
 generating, using the received plurality of individual images, a composite image representing the second student as being present in the same space as the instructor; and
 controlling a terminal apparatus used by the first student to display the generated composite image.

According to the present disclosure, students can realize the feel of being receiving group education.

BRIEF DESCRIPTION OF THE DRAWINGS

In the accompanying drawings:

FIG. 2 is a block diagram illustrating a configuration of a first terminal apparatus according to the embodiment of the present disclosure;

FIG. 3 is a block diagram illustrating a configuration of a second terminal apparatus according to the embodiment of the present disclosure;

FIG. 16 is a flowchart illustrating a variation of the operations of the server apparatus according to the other embodiment of the present disclosure.

DETAILED DESCRIPTION

Figure 1:
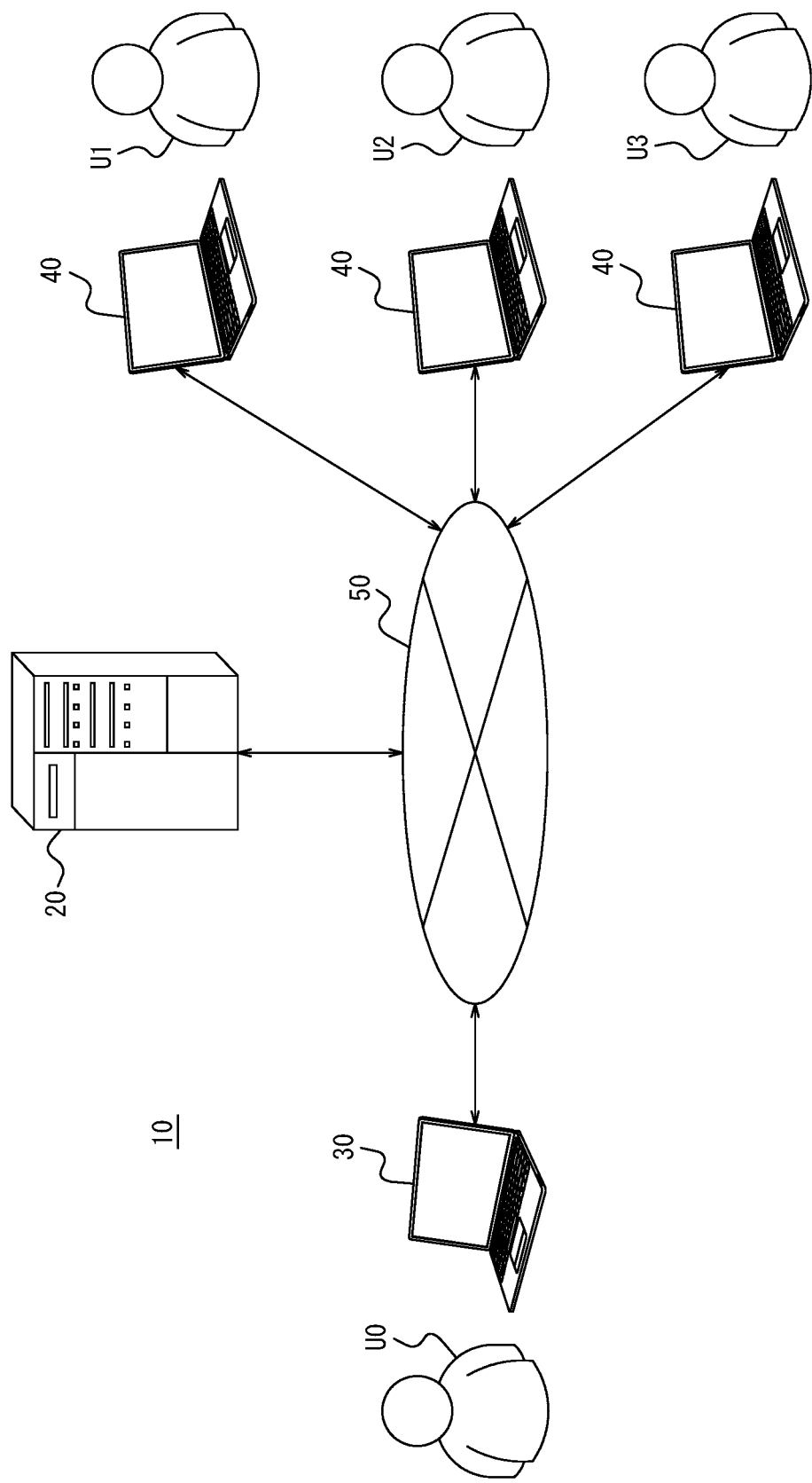
FIG. 1 is a diagram illustrating a configuration of a communication system according to an embodiment of the present disclosure.

Hereinafter, some embodiments of the present disclosure will be described with reference to the drawings.

In the drawings, the same or corresponding portions are denoted by the same reference numerals. In the descriptions of the embodiments, detailed descriptions of the same or corresponding portions are omitted or simplified, as appropriate.

A configuration of a communication system 10 according to an embodiment of the present disclosure will be described with reference to FIG. 1.

The communication system 10 includes a server apparatus 20, a first terminal apparatus 30, and a plurality of second terminal apparatuses 40. The server apparatus 20 can communicate with the first terminal apparatus 30 and the plurality of second terminal apparatuses 40 via a network 50. The first terminal apparatus 30 may be able to communicate with the plurality of second terminal apparatuses 40 via the network 50.

The server apparatus 20 is installed in a facility such as a data center, and operated by a service provider. The server apparatus 20 is a server computer that belongs to a cloud computing system or another type of computing system.

The first terminal apparatus 30 and the plurality of second terminal apparatuses 40 are terminal apparatuses used by an instructor U0 and a plurality of students, respectively, who are present in spaces separate from each other. The number of the students is three in the present embodiment, but can be any number greater than two. The number of the second terminal apparatuses 40 may also be changed according to the number of students, although the number is three in the present embodiment. The first terminal apparatus 30 and the plurality of second terminal apparatuses 40 are each, for example, a general purpose computer such as a PC, a dedicated computer specialized for a particular calculation, or a mobile device such as a mobile phone, smartphone, or tablet. The term "PC" is an abbreviation of personal computer.

The network 50 includes the Internet, at least one WAN, at least one MAN, or any combination thereof. The term "WAN" is an abbreviation of wide area network. The term "MAN" is an abbreviation of metropolitan area network. The network 50 may include at least one wireless network, at least one optical network, or any combination thereof. The wireless network is, for example, an ad hoc network, a cellular network, a wireless LAN, a satellite communication network, or a terrestrial microwave network. The term "LAN" is an abbreviation of local area network.

An outline of the present embodiment will be described with reference to FIG. 1.

Each second terminal apparatus 40 is an education support apparatus that supports online education. The online education is conducted by connecting the first terminal apparatus 30 and the plurality of second terminal apparatuses 40 via the network 50. A second terminal apparatus 40 used by a first student U1 among the plurality of students receives, via the network 50, a plurality of individual images P1 including an image H0 of the instructor U0 and an image H2 of a second student U2, which is different from the first student U1 among the plurality of students. The second terminal apparatus 40 used by the first student U1 generates, using the received plurality of individual images P1, a composite image M1 representing the second student U2 as being present in the same space as the instructor U0. The second terminal apparatus 40 used by the first student U1 controls the second terminal apparatus 40 used by the first student U1 to display the generated composite image M1.

According to the present embodiment, the second terminal apparatus 40 used by the first student U1 displays the image representing the second student U2 as being present in the same space as the instructor U0, thus making it easier for the first student U1 to have the feel of being receiving instruction from the instructor U0 together with the second student U2. In other words, the first student U1 can realize the feel of being receiving group education.

In the present embodiment, the plurality of individual images P1 further includes an image H3 of a third student U3 who is different from the first student U1 and the second student U2 among the plurality of students. The second terminal apparatus 40 used by the first student U1 generates, as the composite image M1, an image representing the second and third students U2 and U3 as being present in the same space as the instructor U0.

According to the present embodiment, the second terminal apparatus 40 used by the first student U1 displays the image representing the second and third students U2 and U3 as being present in the same space as the instructor U0, thus making it easier for the first student U1 to have the feel of being receiving instruction from the instructor U0 together with the second and third students U2 and U3. In other words, the first student U1 can realize the strong feel of being receiving group education.

As with the second terminal apparatus 40 used by the first student U1, a second terminal apparatus 40 used by the second student U2 also receives, via the network 50, a plurality of individual images P2 including an image H0 of the instructor U0, an image H1 of the first student U1, and an image H3 of the third student U3. The second terminal apparatus 40 used by the second student U2 generates, using the received plurality of individual images P2, a composite image M2 representing the first and third students U1 and U3 as being present in the same space as the instructor U0. The second terminal apparatus 40 used by the second student U2 controls the second terminal apparatus 40 used by the second student U2 to display the generated composite image M2.

According to the present embodiment, the second terminal apparatus 40 used by the second student U2 displays the image representing the first and third students U1 and U3 as being present in the same space as the instructor U0, thus making it easier for the second student U2 to have the feel of being receiving instruction from the instructor U0 together with the first and third students U1 and U3. In other words, the second student U2 can also realize the strong feel of being receiving group education.

As with the second terminal apparatuses 40 used by the first and second students U1 and U2, a second terminal apparatus 40 used by the third student U3 also receives, via the network 50, a plurality of individual images P3 including an image H0 of the instructor U0, an image H1 of the first student U1, and an image H2 of the second student U2. The second terminal apparatus 40 used by the third student U3 generates, using the received plurality of individual images P3, a composite image M3 representing the first and second students U1 and U2 as being present in the same space as the instructor U0. The second terminal apparatus 40 used by the third student U3 controls the second terminal apparatus 40 used by the third student U3 to display the generated composite image M3.

According to the present embodiment, the second terminal apparatus 40 used by the third student U3 displays the image representing the first and second students U1 and U2 as being present in the same space as the instructor U0, thus making it easier for the third student U3 to have the feel of being receiving instruction from the instructor U0 together with the first and second students U1 and U2. In other words, the third student U3 can also realize the strong feel of being receiving group education.

A configuration of the first terminal apparatus 30 according to the present embodiment will be described with reference to FIG. 2.

The first terminal apparatus 30 includes a controller 31, a memory 32, a communication interface 33, an input interface 34, and an output interface 35.

The controller 31 includes at least one processor, at least one programmable circuit, at least one dedicated circuit, or any combination thereof. The processor is a general purpose processor such as a CPU or a GPU, or a dedicated processor that is dedicated to specific processing. The term "CPU" is an abbreviation of central processing unit. The term "GPU" is an abbreviation of graphics processing unit. The programmable circuit is, for example, an FPGA. The term "FPGA" is an abbreviation of field-programmable gate array. The dedicated circuit is, for example, an ASIC. The term "ASIC" is an abbreviation of application specific integrated circuit. The controller 31 executes processes related to operations of the first terminal apparatus 30 while controlling components of the first terminal apparatus 30.

The memory 32 includes at least one semiconductor memory, at least one magnetic memory, at least one optical memory, or any combination thereof. The semiconductor memory is, for example, RAM, ROM, or flash memory. The term "RAM" is an abbreviation of random access memory. The term "ROM" is an abbreviation of read only memory. The RAM is, for example, SRAM or DRAM. The term "SRAM" is an abbreviation of static random access memory. The term "DRAM" is an abbreviation of dynamic random access memory. The ROM is, for example, EEPROM. The term "EEPROM" is an abbreviation of electrically erasable programmable read only memory. The flash memory is, for example, SSD. The term "SSD" is an abbreviation of solid-state drive. The magnetic memory is, for example, HDD. The term "HDD" is an abbreviation of hard disk drive. The memory 32 functions as, for example, a main memory, an auxiliary memory, or a cache memory. The memory 32 stores data to be used for the operations of the first terminal apparatus 30 and data obtained by the operations of the first terminal apparatus 30.

The communication interface 33 includes at least one interface for communication. The interface for communication is, for example, an interface compatible with a wired LAN communication standard such as Ethernet® (Ethernet is a registered trademark in Japan, other countries, or both), or an interface compatible with a wireless LAN communication standard such as IEEE802.11 or a mobile communication standard such as LTE, the 4G standard, or the 5G standard. The name "IEEE" is an abbreviation of Institute of Electrical and Electronics Engineers. The term "LTE" is an abbreviation of Long Term Evolution. The term "4G" is an abbreviation of 4th generation. The term "5G" is an abbreviation of 5th generation. The communication interface 33 communicates with the server apparatus 20. The communication interface 33 may communicate with the plurality of second terminal apparatuses 40. The communication interface 33 receives data to be used for the operations of the first terminal apparatus 30, and transmits data obtained by the operations of the first terminal apparatus 30.

The input interface 34 includes at least one interface for input. The interface for input is, for example, a physical key, a capacitive key, a pointing device, a touch screen integrally provided with a display, a camera, a LiDAR sensor, or a microphone. "LiDAR" is an abbreviation of light detection and ranging. The camera is, for example, an RGB camera or a combination of an RGB camera and a depth camera. The input interface 34 accepts an operation for inputting data to be used for the operations of the first terminal apparatus 30. The input interface 34, instead of being included in the first terminal apparatus 30, may be connected to the first terminal apparatus 30 as an external input device. As an interface for connection, an interface compliant with a standard such as USB, HDMI® (HDMI is a registered trademark in Japan, other countries, or both), or Bluetooth® (Bluetooth is a registered trademark in Japan, other countries, or both) can be used. The term "USB" is an abbreviation of Universal Serial Bus. The term "HDMI®" is an abbreviation of High-Definition Multimedia Interface.

The output interface 35 includes at least one interface for output. The interface for output is, for example, a display or a speaker. The display is, for example, an LCD or an organic EL display. The term "LCD" is an abbreviation of liquid crystal display. The term "EL" is an abbreviation of electro luminescent. The output interface 35 outputs data obtained by the operations of the first terminal apparatus 30. The output interface 35, instead of being included in the first terminal apparatus 30, may be connected to the first terminal apparatus 30 as an external output device. As an interface for connection, an interface compliant with a standard such as USB, HDMI®, or Bluetooth® can be used.

The functions of the first terminal apparatus 30 are realized by execution of a program according to the present embodiment by a processor serving as the controller 31. That is, the functions of the first terminal apparatus 30 are realized by software. The program causes a computer to execute the operations of the first terminal apparatus 30, thereby causing the computer to function as the first terminal apparatus 30. That is, the computer executes the operations of the first terminal apparatus 30 in accordance with the program to thereby function as the first terminal apparatus 30.

The program can be stored on a non-transitory computer readable medium. The non-transitory computer readable medium is, for example, flash memory, a magnetic recording device, an optical disc, a magneto-optical recording medium, or ROM. The program is distributed, for example, by selling, transferring, or lending a portable medium such as an SD card, a DVD, or a CD-ROM on which the program is stored. The term "SD" is an abbreviation of Secure Digital. The term "DVD" is an abbreviation of digital versatile disc. The term "CD-ROM" is an abbreviation of compact disc read only memory. The program may be distributed by storing the program in a storage of a server and transferring the program from the server to another computer. The program may be provided as a program product.

For example, the computer temporarily stores, in a main memory, a program stored in a portable medium or a program transferred from a server. Then, the computer reads the program stored in the main memory using a processor, and executes processes in accordance with the read program using the processor. The computer may read a program directly from the portable medium, and execute processes in accordance with the program. The computer may, each time a program is transferred from the server to the computer, sequentially execute processes in accordance with the received program. Instead of transferring a program from the server to the computer, processes may be executed by a so-called ASP type service that realizes functions only by execution instructions and result acquisitions. The term "ASP" is an abbreviation of application service provider. Programs encompass information that is to be used for processing by an electronic computer and is thus equivalent to a program. For example, data that is not a direct command to a computer but has a property that regulates processing of the computer is "equivalent to a program" in this context.

Some or all of the functions of the first terminal apparatus 30 may be realized by a programmable circuit or a dedicated circuit serving as the controller 31. That is, some or all of the functions of the first terminal apparatus 30 may be realized by hardware.

A configuration of each second terminal apparatus 40 according to the present embodiment will be described with reference to FIG. 3.

The second terminal apparatus 40 includes a controller 41, a memory 42, a communication interface 43, an input interface 44, and an output interface 45.

The controller 41 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 41 executes processes related to operations of the second terminal apparatus 40 while controlling components of the second terminal apparatus 40.

The memory 42 includes at least one semiconductor memory, at least one magnetic memory, at least one optical memory, or any combination thereof. The semiconductor memory is, for example, RAM, ROM, or flash memory. The RAM is, for example, SRAM or DRAM. The ROM is, for example, EEPROM. The flash memory is, for example, SSD. The magnetic memory is, for example, HDD. The memory 42 functions as, for example, a main memory, an auxiliary memory, or a cache memory. The memory 42 stores data to be used for the operations of the second terminal apparatus 40 and data obtained by the operations of the second terminal apparatus 40.

The communication interface 43 includes at least one interface for communication. The interface for communication is, for example, an interface compatible with a wired LAN communication standard such as Ethernet®, or an interface compatible with a wireless LAN communication standard such as IEEE802.11 or a mobile communication standard such as LTE, the 4G standard, or the 5G standard.

The communication interface 43 communicates with the server apparatus 20. The communication interface 43 may communicate with the first terminal apparatus 30. The communication interface 43 receives data to be used for the operations of the second terminal apparatus 40, and transmits data obtained by the operations of the second terminal apparatus 40.

The input interface 44 includes at least one interface for input. The interface for input is, for example, a physical key, a capacitive key, a pointing device, a touch screen integrally provided with a display, a camera, a LiDAR sensor, or a microphone. The camera is, for example, an RGB camera or a combination of an RGB camera and a depth camera. The input interface 44 accepts an operation for inputting data to be used for the operations of the second terminal apparatus 40. The input interface 44, instead of being included in the second terminal apparatus 40 may be connected to the second terminal apparatus 40 as an external input device. As an interface for connection, an interface compliant with a standard such as USB, HDMI®, or Bluetooth® can be used.

The output interface 45 includes at least one interface for output. The interface for output is, for example, a display or a speaker. The display is, for example, an LCD or an organic EL display. The output interface 45 outputs data obtained by the operations of the second terminal apparatus 40. The output interface 45, instead of being included in the second terminal apparatus 40, may be connected to the second terminal apparatus 40 as an external output device. As an interface for connection, an interface compliant with a standard such as USB, HDMI®, or Bluetooth® can be used.

The functions of the second terminal apparatus 40 are realized by execution of another program according to the present embodiment by a processor serving as the controller 41. That is, the functions of the second terminal apparatus 40 are realized by software. The program causes a computer to execute the operations of the second terminal apparatus 40, thereby causing the computer to function as the second terminal apparatus 40. That is, the computer executes the operations of the second terminal apparatus 40 in accordance with the program to thereby function as the second terminal apparatus 40.

Some or all of the functions of the second terminal apparatus 40 may be realized by a programmable circuit or a dedicated circuit serving as the controller 41. That is, some or all of the functions of the second terminal apparatus 40 may be realized by hardware.

Figure 4:
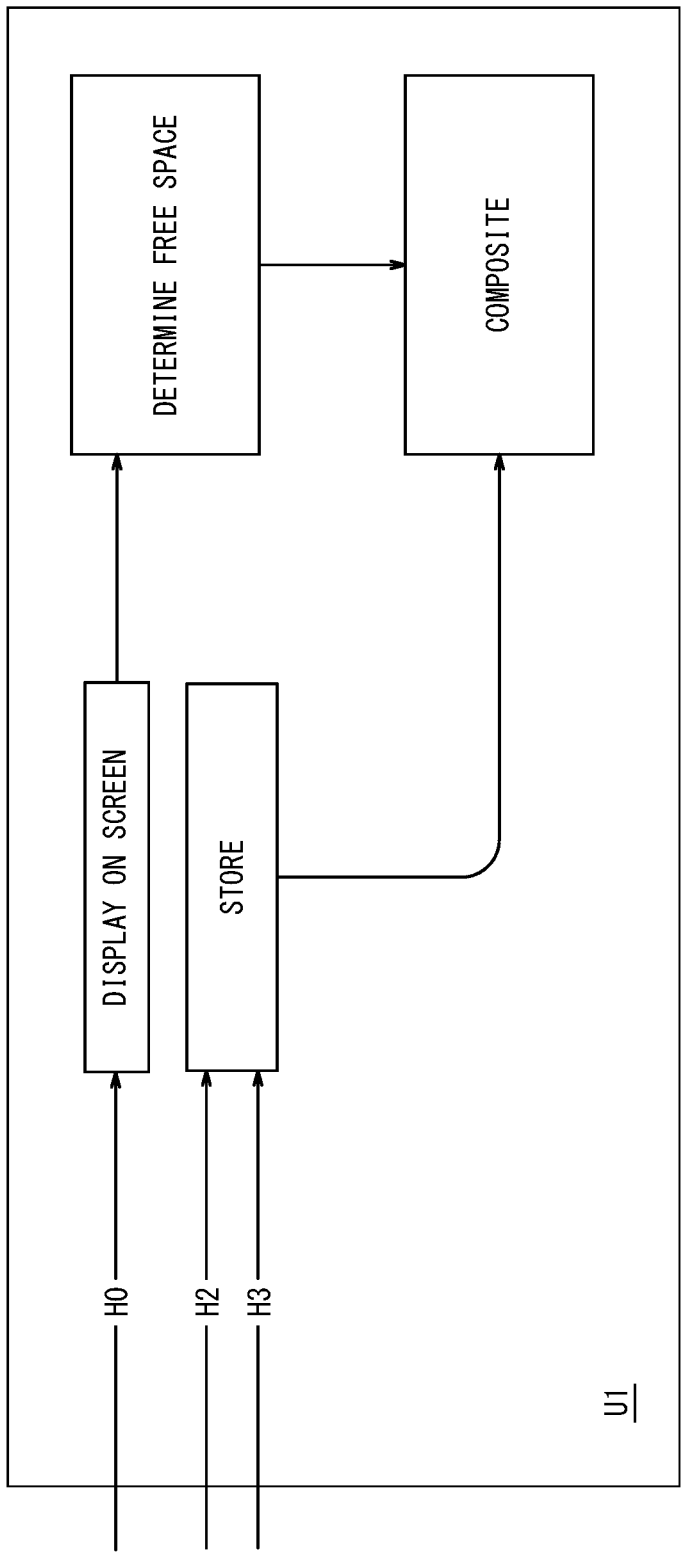
FIG. 4 is a diagram illustrating the function of the second terminal apparatus according to the embodiment of the present disclosure.

The function of the second terminal apparatus 40 used by the first student U1 will be described with reference to FIG. 4. The functions of the second terminal apparatuses 40 used by the second and third students U2 and U3 are the same as the function of the second terminal apparatus 40 used by the first student U1, and thus descriptions thereof are omitted.

Figure 5:
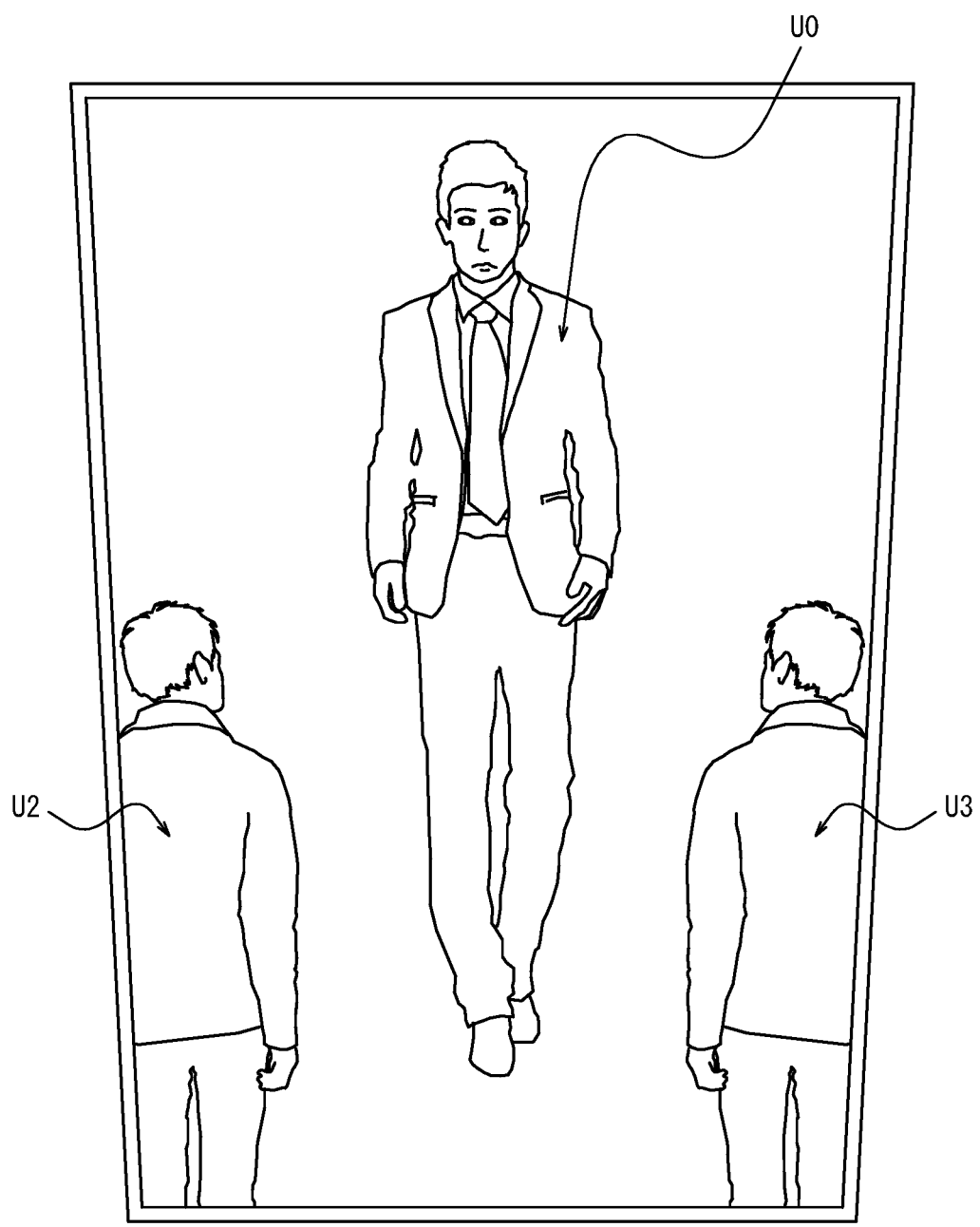
FIG. 5 is a diagram illustrating an example of a screen of the second terminal apparatus according to the embodiment of the present disclosure.

The controller 41 of the second terminal apparatus 40 receives, via the communication interface 43, an image H0 of the instructor U0, an image H2 of the second student U2, and an image H3 of the third student U3. The controller 41 displays the received image H0 on a display as the output interface 45, so that the instructor U0 is displayed in the middle of a screen. The controller 41 stores the received images H2 and H3 in the memory 42. Upon determining that there is free space at both ends of the screen, the controller 41 composites the images H2 and H3 stored in the memory 42 with the image H0 on display so that the second student U2 is displayed at a first end of the screen and the third student U3 at a second end of the screen. The controller 41 then displays the image as illustrated in FIG. 5 on the display. In this image, the instructor U0 is facing the front, which gives the impression that the instructor U0 is looking at the students, while the second and third students U2 and U3 are facing the back, which gives the impression that the second and third students U2 and U3 are looking at the instructor U0.

It is conceivable that the present embodiment could be applied to simultaneously provide a plurality of students with a lesson that requires the instructor U0 to provide an example, such as a dance class or karate class. When each student imitates the instructor U0, it is essential to display the instructor U0 in the middle of the screen, for example, to draw attention to the instructor U0. By applying the function illustrated in FIG. 4, not only is the instructor U0 displayed in the middle of the screen of each student's terminal, but also only half bodies of the other students are displayed on both the left and right sides, for example, so that the other students do not interfere with the student's view, thus making it easier for each student to have the feel of being taking a group lesson. The other students may be displayed in the front, back, or both, instead of the left and right.

A display method may be changed according to an education mode, such as individual education or group education. In the case of an individual education mode in which the instructor U0 provides instruction to a specific student, only the instructor U0 may be displayed, or only the instructor U0 and specific student may be displayed, while the other students may not be displayed. In the case of a group education mode in which the instructor U0 provides instruction to a plurality of students, as in the example of FIG. 5, the instructor U0 may be displayed in the middle and the other students are displayed around the instructor U0 to make the students aware of the group education.

The function of the second terminal apparatus 40 used by the first student U1, in a case in which a display method is changed according to the education mode and the first student U1 receives individual instruction in the individual education mode, will be described with reference to FIG. 6.

Figure 7:
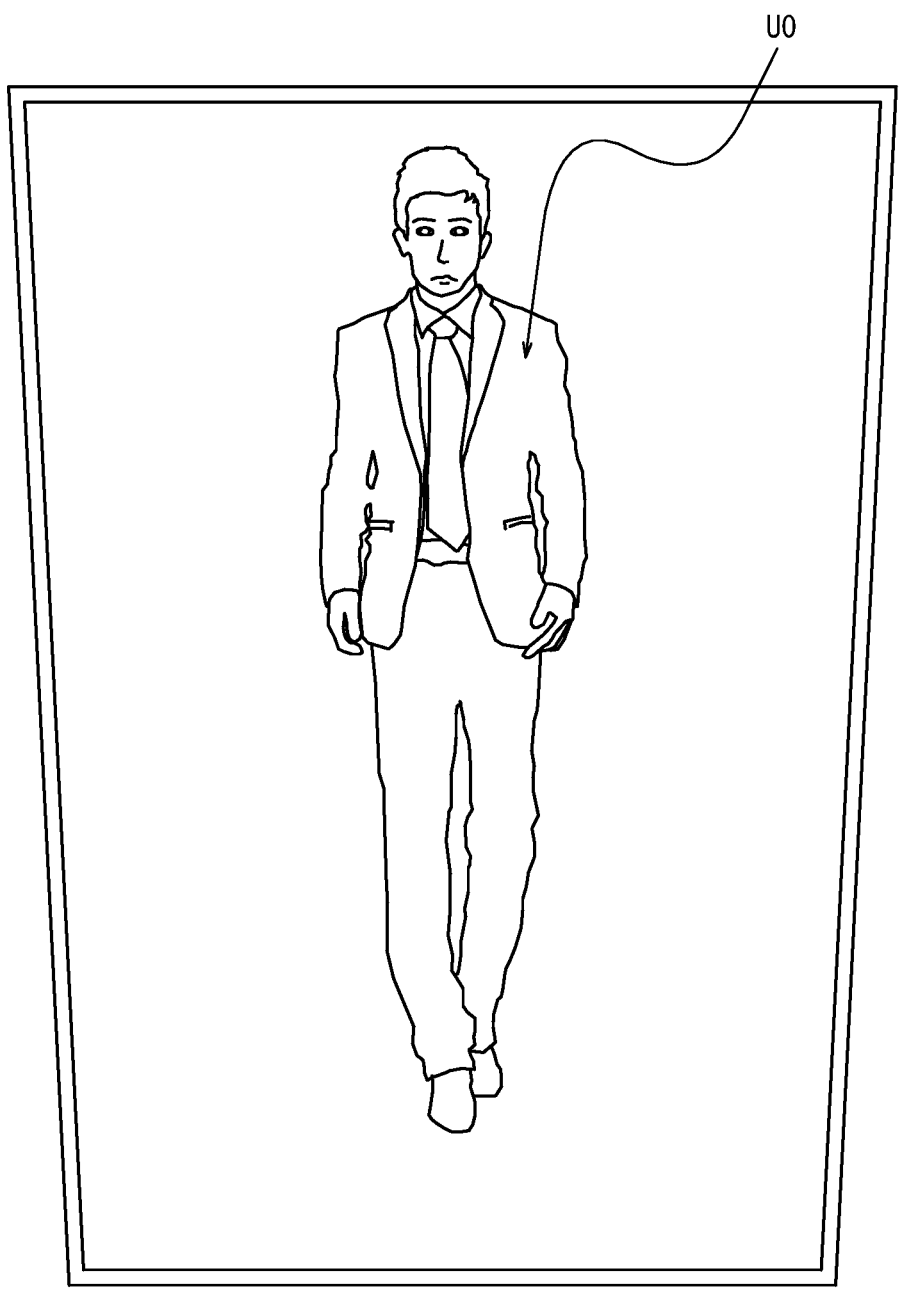
FIG. 7 is a diagram illustrating an example of a screen of the second terminal apparatus according to the embodiment of the present disclosure.

The controller 41 of the second terminal apparatus 40 receives, via the communication interface 43, control data C0 specifying an education mode in addition to an image H0 of the instructor U0, an image H2 of the second student U2, and an image H3 of the third student U3. The controller 41 displays the received image H0 on a display as the output interface 45, so that the instructor U0 is displayed in the middle of a screen. When the education mode specified by the received control data C0 is the group education mode, the controller 41 stores the received images H2 and H3 in the memory 42. Then, upon determining that there is free space at both ends of the screen, the controller 41 composites the images H2 and H3 stored in the memory 42 with the image H0 on display so that the second student U2 is displayed at a first end of the screen and the third student U3 at a second end of the screen. The controller 41 then displays the image as illustrated in FIG. 5 on the display. On the other hand, when the education mode specified by the received control data C0 is the individual education mode, the controller 41 abandons the received images H2 and H3. As a result, the controller 41 displays the image as illustrated in FIG. 7 on the display.

Figure 8:
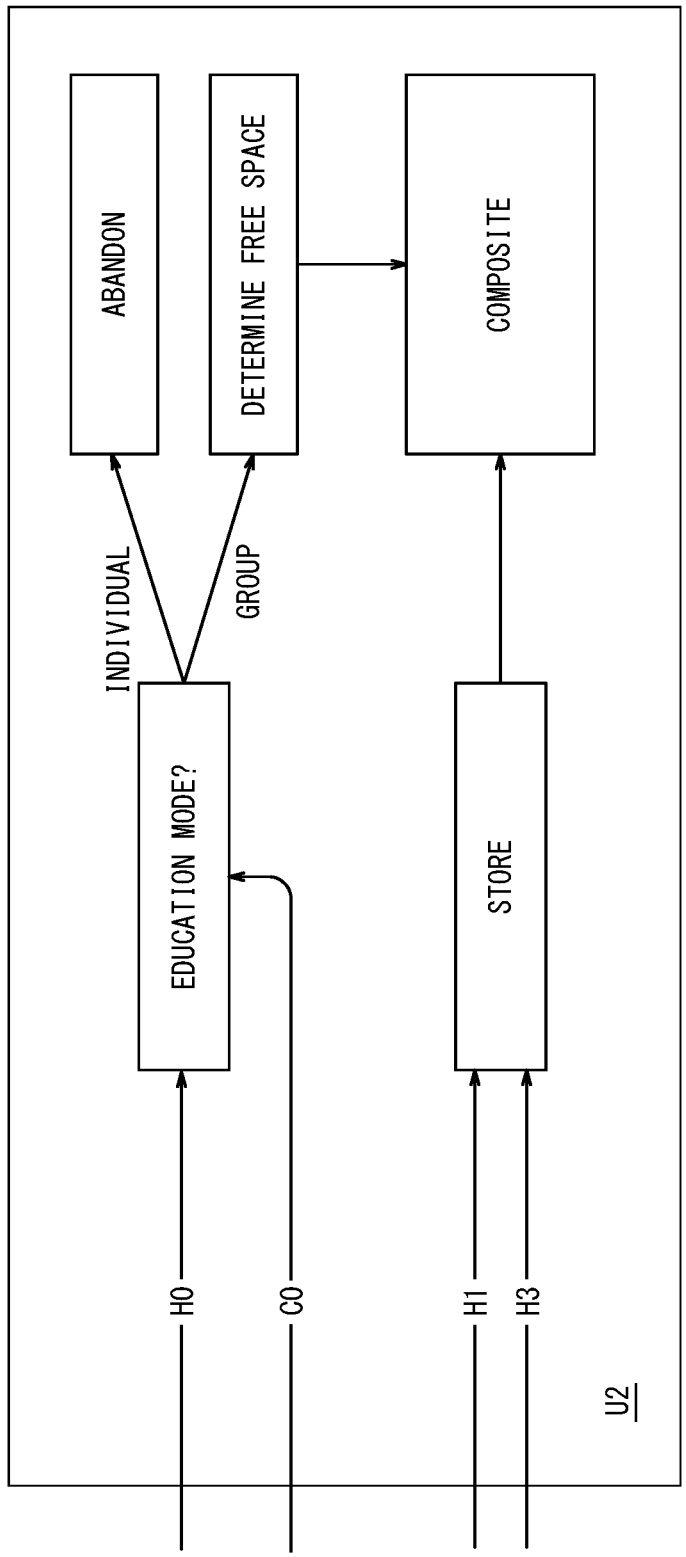
FIG. 8 is a diagram illustrating a variation of the function of the second terminal apparatus according to the embodiment of the present disclosure.

The function of the second terminal apparatus 40 used by the second student U2, when a display method is changed according to the education mode and the first student U1 receives individual instruction in the individual education mode, will be described with reference to FIG. 8. The function of the second terminal apparatus 40 used by the third student U3 is the same as that of the second terminal apparatus 40 used by the second student U2, and thus a description thereof is omitted.

Figure 9:
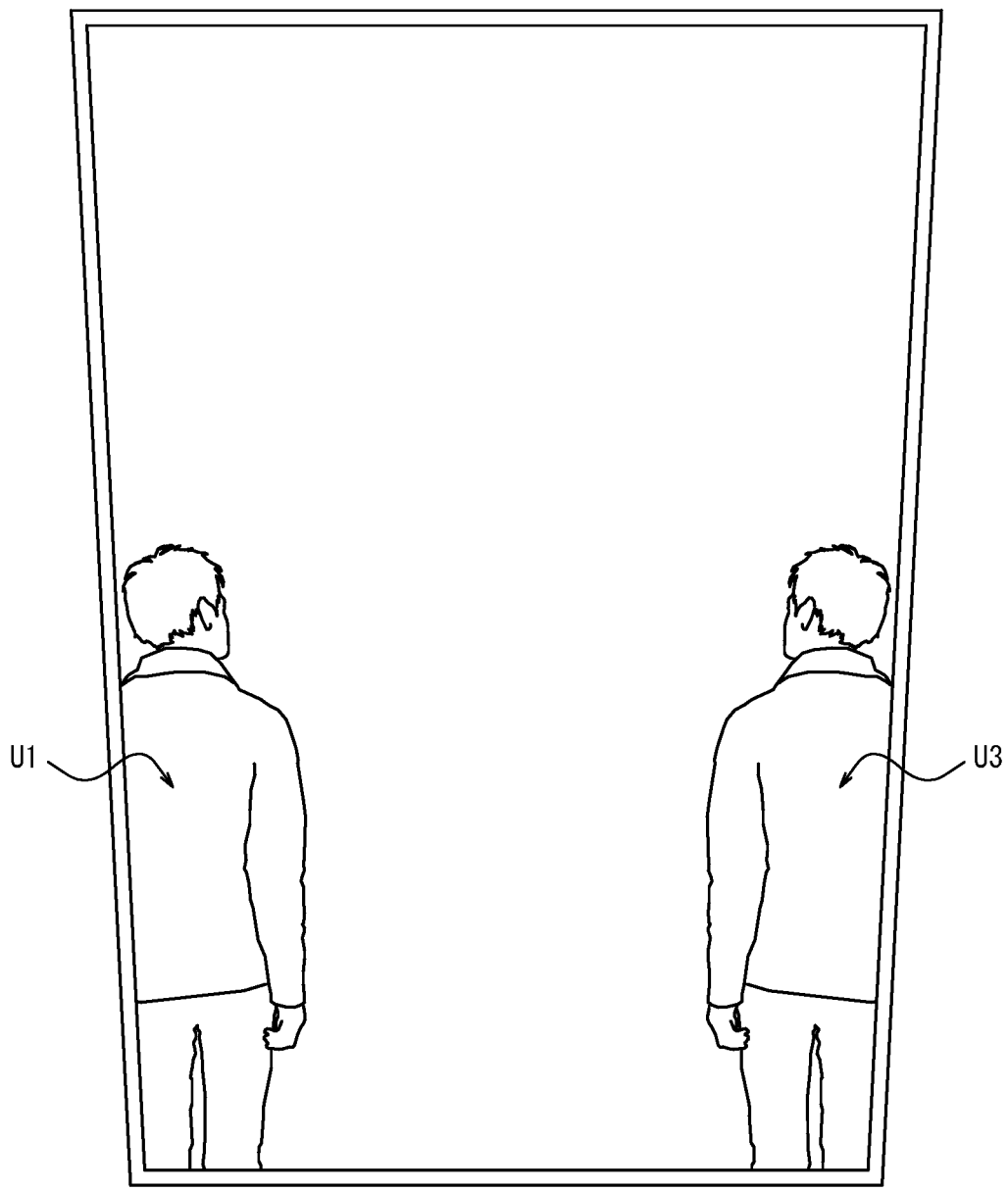
FIG. 9 is a diagram illustrating an example of a screen of the second terminal apparatus according to the embodiment of the present disclosure.

The controller 41 of the second terminal apparatus 40 receives, via the communication interface 43, control data C0 in addition to an image H0 of the instructor U0, an image H1 of the first student U1, and an image H3 of the third student U3. The controller 41 stores the received images H1 and H3 in the memory 42. The controller 41 displays the images H1 and H3 stored in the memory 42 on a display as the output interface 45 so that the first student U1 is displayed at a first end of a screen and the third student U3 at a second end of the screen. When the education mode specified by the received control data C0 is the group education mode, upon determining that there is free space in the middle of the screen, the controller 41 composites the received image H0 with the images H1 and H3 on display so that the instructor U0 is displayed in the middle of the screen. The controller 41 then displays, on the display, the image similar to FIG. 5, except that the second student U2 is replaced by the first student U1. On the other hand, when the education mode specified by the received control data C0 is the individual education mode, the controller 41 abandons the received image H0. As a result, the controller 41 displays the image as illustrated in FIG. 9 on the display. The controller 41 may not display the first student U1 so that it can be recognized that the first student U1 is receiving individual instruction.

Figure 6:
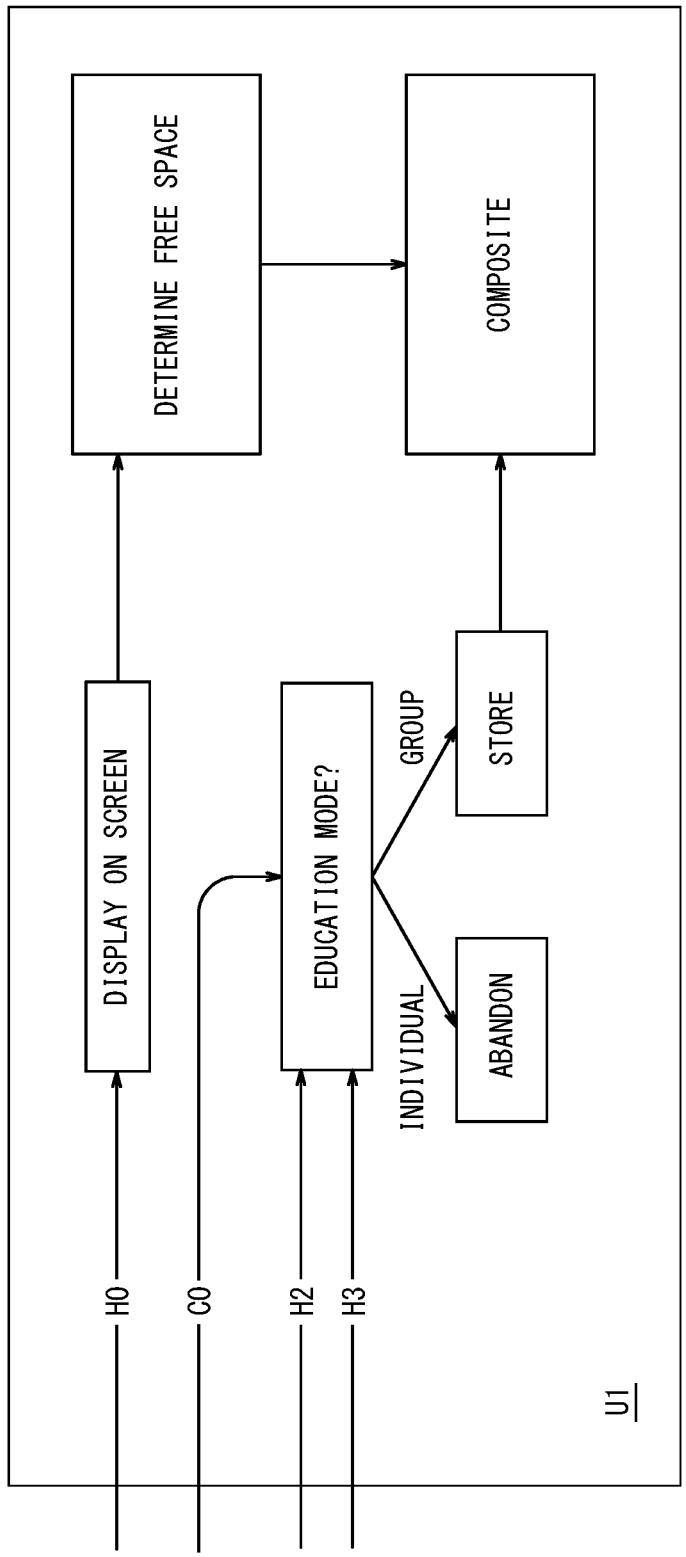
FIG. 6 is a diagram illustrating a variation of the function of the second terminal apparatus according to the embodiment of the present disclosure.

By applying the function illustrated in FIG. 6, upon selecting a mode in which the instructor U0 provides one-on-one instruction to a specific student, the other students are not displayed, thus making it easier for the specific student to have the feeling that only the specific student himself/herself is taking a private lesson in the middle of a group lesson. By applying the function illustrated in FIG. 8, upon selecting a mode in which the instructor U0 provides one-on-one instruction to another student, the instructor U0 is not displayed, thus making it easier for students to have the feeling that the other student is taking a private lesson in the middle of a group lesson. During the private lesson, a voice of the instructor U0 should be audible only to the student who is receiving the instruction.

As a mode in which the instructor U0 provides one-on-one instruction to another student, it may be possible to select either a private mode in which the instructor U0 does not show himself/herself to anyone other than the student who is receiving one-on-one instruction, or a public mode in which the instructor U0 shows himself/herself to anyone other than the student who is receiving one-on-one instruction. In such a variation, the instructor U0 is not displayed when the private mode is selected, while the instructor U0 remains displayed when the public mode is selected. Thus, lesson contents can be shared when the contents of a private lesson is helpful to someone other than the student who is receiving the instruction. In the private mode, a voice of the instructor U0 should be audible only to the student who is receiving the instruction. In the public mode, the voice of the instructor U0 can be audible to students who are not receiving the instruction.

Operations of the communication system 10 according to the present embodiment will be described with reference to FIGS. 10 and 11. These operations correspond to an education support method according to the present embodiment.

Figure 10:
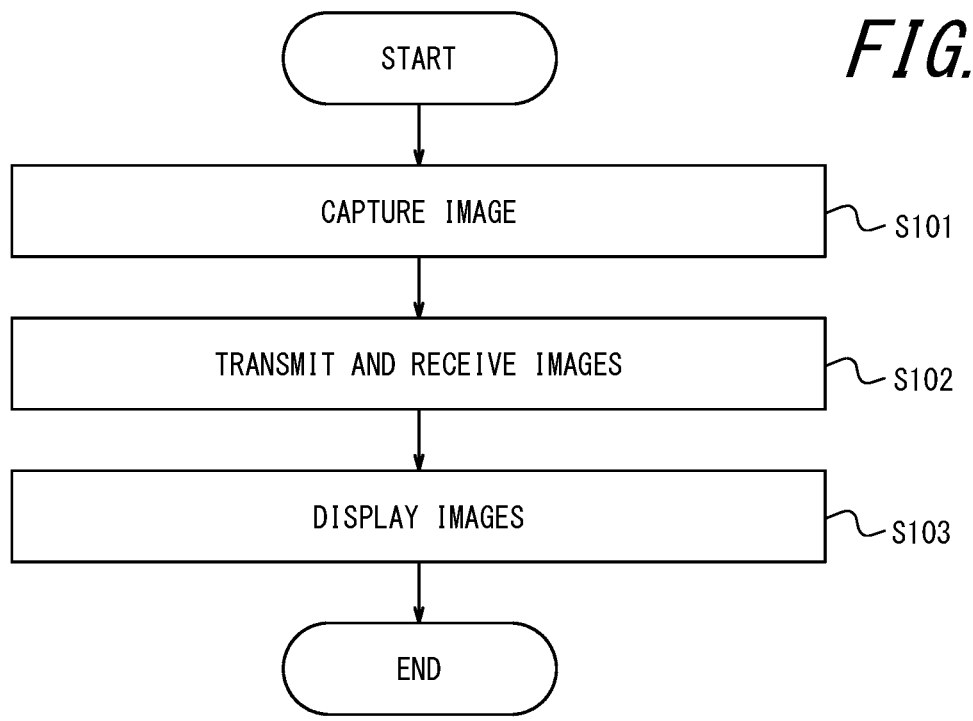
FIG. 10 is a flowchart illustrating operations of the first terminal apparatus according to the embodiment of the present disclosure.

FIG. 10 illustrates operations of the first terminal apparatus 30 used by the instructor U0.

The processes from step S101 to step S103 are repeated while the online education is conducted.

In step S101, the controller 31 captures an image H0 of the instructor U0 using a camera as the input interface 34. The controller 31 may acquire a voice of the instructor U0 via a microphone as the input interface 34.

In step S102, the controller 31 transmits the image H0 captured in step S101 to the server apparatus 20 via the communication interface 33, and receives a plurality of individual images P0 including an image H1 of the first student U1, an image H2 of the second student U2, and an image H3 of the third student U3 from the server apparatus 20 via the communication interface 33. When the voice of the instructor U0 is acquired in step S101, the controller 31 also transmits the acquired voice to the server apparatus 20 via the communication interface 33. The controller 31 may further receive a voice of the first student U1, second student U2, or third student U3 from the server apparatus 20 via the communication interface 33.

The server apparatus 20 receives the image H0 of the instructor U0 from the first terminal apparatus 30 via the network 50. The server apparatus 20 transmits the received image H0 as is or processed into a hologram to the second terminal apparatus 40 via the network 50. When the voice of the instructor U0 is received from the first terminal apparatus 30, the server apparatus 20 also transmits the received voice to the second terminal apparatus 40 via the network 50.

In step S103, the controller 31 displays the plurality of individual images P0 received in step S102 on a display as the output interface 35. When the voice of the first student U1, second student U2, or third student U3 is received in step S102, the controller 31 outputs the received voice from a speaker as the output interface 35.

Figure 11:
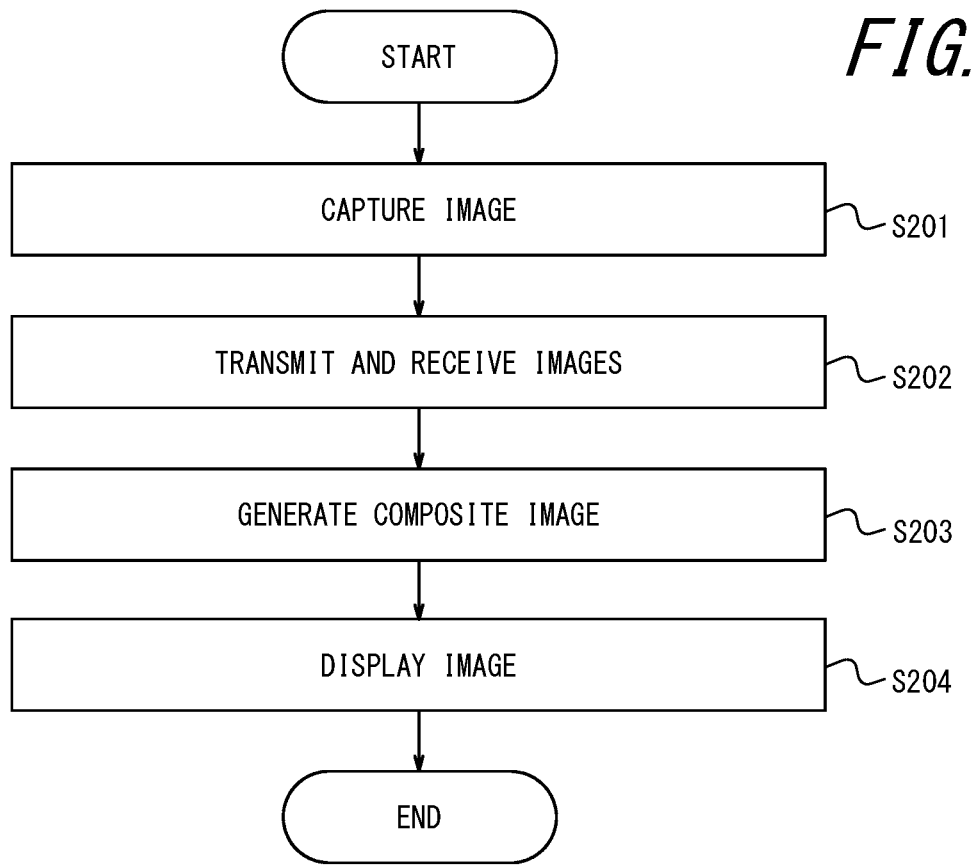
FIG. 11 is a flowchart illustrating operations of the second terminal apparatus according to the embodiment of the present disclosure.

FIG. 11 illustrates operations of the second terminal apparatus 40 used by the first student U1. These operations correspond to the function illustrated in FIG. 4. Operations of the second terminal apparatuses 40 used by the second and third students U2 and U3 are the same as those of the second terminal apparatus 40 used by the first student U1, and thus descriptions thereof are omitted.

The processes from step S201 to step S204 are repeated while the online education is conducted.

In step S201, the controller 41 captures an image H1 of the first student U1 using a camera as the input interface 44. The controller 41 may acquire a voice of the first student U1 via a microphone as the input interface 44.

In step S202, the controller 41 transmits the image H1 captured in step S201 to the server apparatus 20 via the communication interface 43, and receives a plurality of individual images P1 including an image H0 of the instructor U0 and an image H2 of the second student U2 from the server apparatus 20 via the communication interface 43. In the present embodiment, the plurality of individual images P1 further includes an image H3 of the third student U3. When the voice of the first student U1 is acquired in step S201, the controller 41 also transmits the acquired voice to the server apparatus 20 via the communication interface 43. The controller 41 may further receive a voice of the instructor U0, second student U2, or third student U3 from the server apparatus 20 via the communication interface 43.

The server apparatus 20 receives the image H1 of the first student U1 from the second terminal apparatus 40 via the network 50. The server apparatus 20 transmits the received image H1 as is or processed into a hologram to the first terminal apparatus 30 via the network 50. When the voice of the first student U1 is received from the second terminal apparatus 40, the server apparatus 20 also transmits the received voice to the first terminal apparatus 30 via the network 50.

In step S203, the controller 41 generates, using the plurality of individual images P1 received in step S202, a composite image M1 representing the second student U2 as being present in the same space as the instructor U0. For example, the controller 41 generates, as the composite image M1, an image displaying the instructor U0 in the middle of a screen and displaying the second student U2 at a first end of the screen, as illustrated in FIG. 5. In the present embodiment, the controller 41 generates, as the composite image M1, an image representing the second and third students U2 and U3 as being present in the same space as the instructor U0. For example, the controller 41 generates, as the composite image M1, an image displaying the third student U3 at a second end of the screen, as illustrated in FIG. 5.

In step S204, the controller 41 displays the composite image M1 generated in step S203 on a display as the output interface 45. When the voice of the instructor U0, second student U2, or third student U3 is received in step S202, the controller 41 outputs the received voice from a speaker as the output interface 45.

According to the present embodiment, owing to the operations described above, it is easier for students to have the feel of being receiving instruction with other students. In other words, the students can realize the feel of being receiving group education.

A variation of the operations of the communication system 10 according to the present embodiment will be described with reference to FIGS. 12 and 13.

Figure 12:
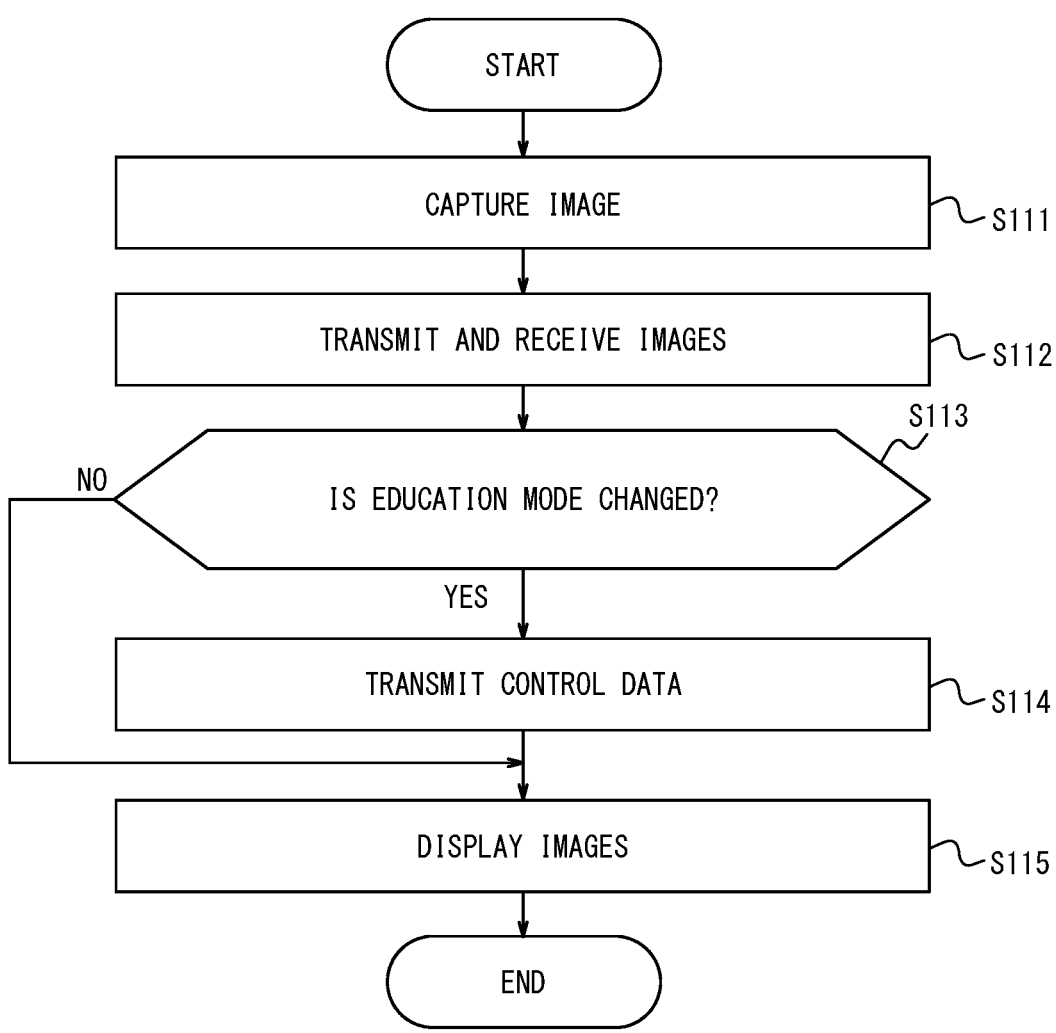
FIG. 12 is a flowchart illustrating a variation of the operations of the first terminal apparatus according to the embodiment of the present disclosure.

FIG. 12 illustrates the operations of the first terminal apparatus 30 used by the instructor U0 when a display method is changed according to an education mode.

The processes from step S111 to step S115 are repeated while the online education is conducted. The processes in steps S111, S112, and S115 are the same as the processes in steps S101 to S103 in FIG. 10, respectively, and thus descriptions thereof are omitted.

In step S113, upon accepting, via the input interface 34, an operation by the instructor U0 to switch the education mode, the controller 31 determines whether the education mode after the switchover is a group education mode in which a plurality of students simultaneously receive instruction from the instructor U0 or an individual education mode in which only a specific student among the plurality of students individually receives instruction from the instructor U0. Then, the process in step S114 is performed. When the operation to switch the education mode is not performed in step S113 or when the process in step S114 is completed, the process in step S115 is performed.

In step S114, the controller 31 transmits control data C0 specifying the education mode after the switchover, as determined in step S113, to the server apparatus 20 via the communication interface 33. In the present embodiment, when the individual education mode is specified, the control data C0 includes data identifying the specific student, i.e., the student who is to receive instruction from the instructor U0.

The server apparatus 20 receives the control data C0 from the first terminal apparatus 30 via the network 50. The server apparatus 20 transmits the received control data C0 as is or processed as appropriate to the second terminal apparatuses 40 via the network 50.

Figure 13:
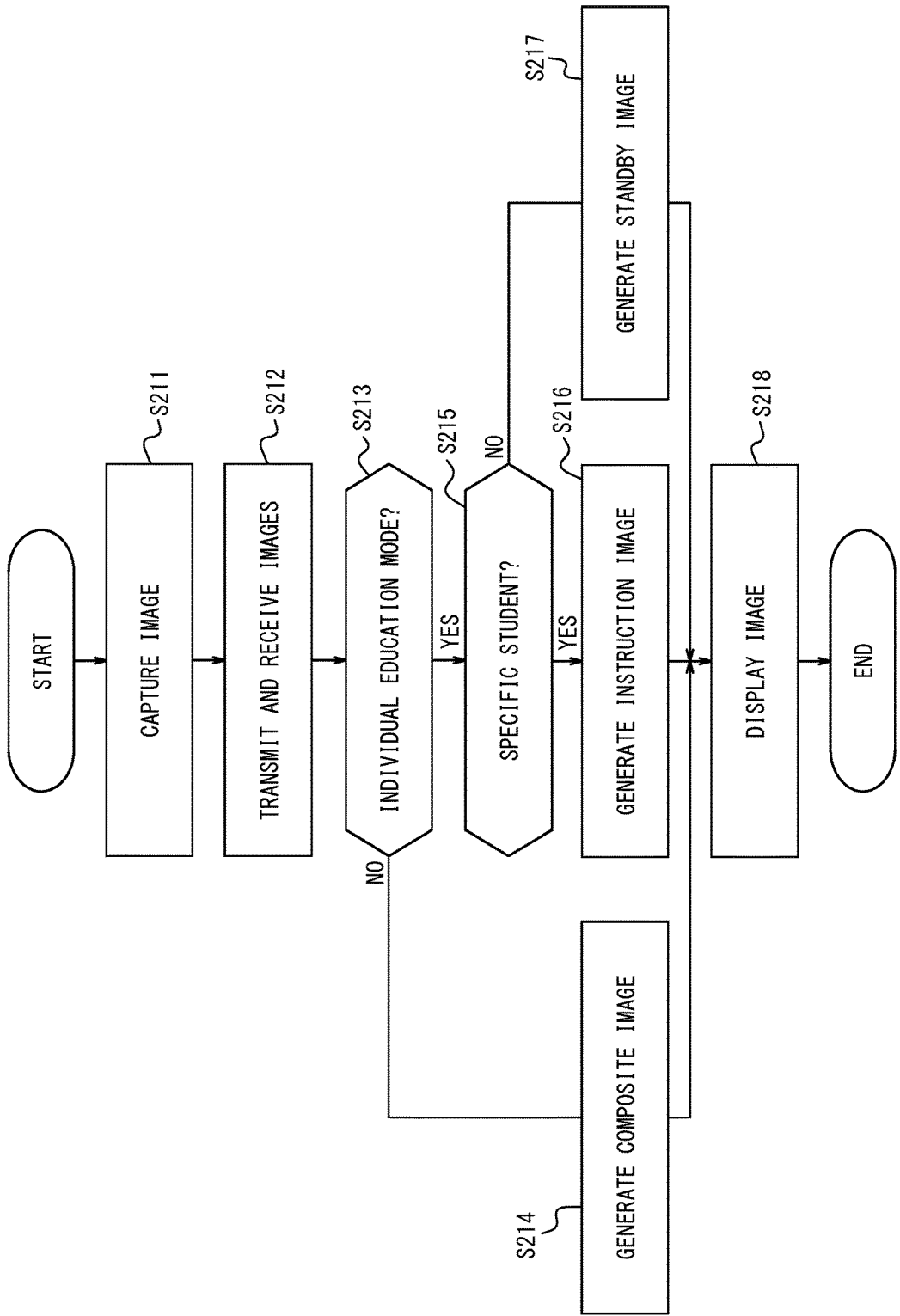
FIG. 13 is a flowchart illustrating a variation of the operations of the second terminal apparatus according to the embodiment of the present disclosure.

FIG. 13 illustrates the operations of the second terminal apparatus 40 used by the first student U1 when a display method is changed according to the education mode. These operations correspond to the function illustrated in FIGS. 6 and 8. Operations of the second terminal apparatuses 40 used by the second and third students U2 and U3 are the same as those of the second terminal apparatus 40 used by the first student U1, and thus descriptions thereof are omitted.

The processes from step S211 to step S218 are repeated while the online education is conducted. The processes in steps S211, S212, and S214 are the same as the processes in steps S201 to S203 in FIG. 11, respectively, and thus descriptions thereof are omitted.

In Step S213, the controller 41 receives control data C0 from the server apparatus 20 via the communication interface 43. When an education mode specified by the received control data C0 is the group education mode, i.e., when the group education mode is selected, the process in step S214 is performed. When the education mode specified by the received control data C0 is the individual education mode, i.e., when the individual education mode is selected, the process in step S215 is performed.

In step S215, the controller 41 determines whether a student identified by the control data C0 received in step S213 is the first student U1. When it is determined that the student identified by the control data C0 is the first student U1, the process in step S216 is performed. When it is determined that the student identified by the control data C0 is not the first student U1, the process in step S217 is performed.

In step S216, the controller 41 generates an instruction image L1 displaying only the instructor U0 or only the instructor U0 and first student U1, as a different image from the composite image M1 generated in step S214. For example, the controller 41 generates, as the instruction image L1, an image displaying the instructor U0 in the middle of a screen and none of the students, as illustrated in FIG. 7. Then, the process in step S218 is performed.

In step S217, the controller 41 generates a standby image W1 representing the first student U1 as being present in a different space from the instructor U0, as a different image from the composite image M1 generated in step S214. For example, the controller 41 generates, as the standby image W1, an image similar to FIG. 9, except that the first student U1 is replaced by the second student U2, in which the second student U2 is displayed at a first end of a screen, the third student U3 is displayed at a second end of the screen, and the instructor U0 is not displayed. The controller 41 may not display a student identified by the control data C0, of the second student U2 and third student U3, so as to recognize who is receiving individual instruction. Then, the process in step S218 is performed.

In step S218, when the composite image M1 is generated in step S214, the controller 41 displays the generated composite image M1 on a display as the output interface 45. When the instruction image L1 is generated in step S216, the controller 41 displays the generated instruction image L1 on the display. When the standby image W1 is generated in step S217, the controller 41 displays the generated standby image W1 on the display. When a voice of the instructor U0, second student U2, or third student U3 is received in step S212, the controller 41 outputs the received voice from a speaker as the output interface 45.

According to the present embodiment, owing to the operations described above, it is easier, in the group education mode, for students to have the feel of being receiving instruction together with other students. In other words, the students can realize the feel of being receiving group education. On the other hand, in the individual education mode, it is easier for a student to have the feel of being receiving individual instruction. In other words, the student can realize the feel of being receiving individual education.

As another embodiment of the present disclosure, instead of configuring each second terminal apparatus 40 as an education support apparatus, the server apparatus 20 may be configured as an education support apparatus.

A configuration of the communication system 10 according to the present embodiment is the same as that illustrated in FIG. 1, and therefore a description thereof is omitted.

Figure 14:
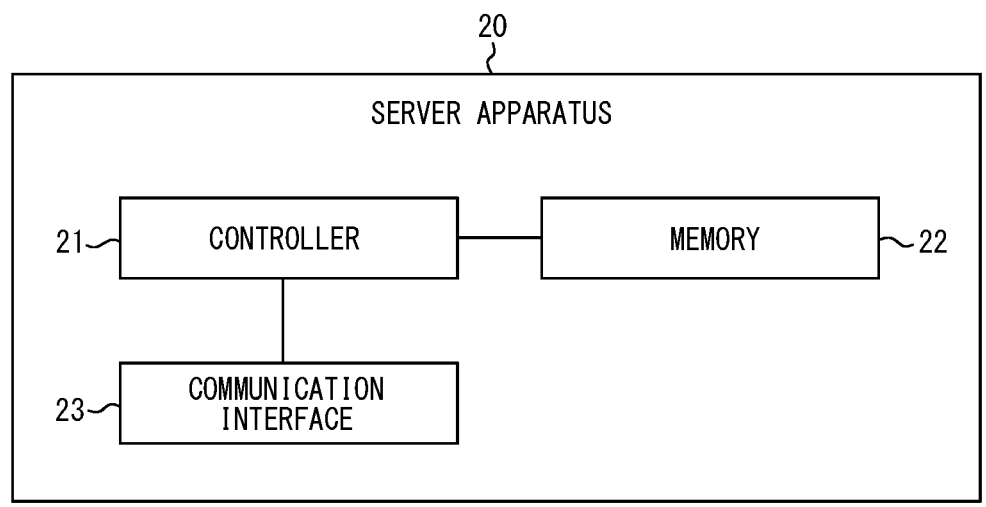
FIG. 14 is a block diagram illustrating a configuration of a server apparatus according to another embodiment of the present disclosure.

A configuration of the server apparatus 20 according to the present embodiment will be described with reference to FIG. 14.

The server apparatus 20 includes a controller 21, a memory 22, and a communication interface 23.

The controller 21 includes at least one processor, at least one programmable circuit, at least one dedicated circuit, or any combination thereof. The processor is a general purpose processor such as a CPU or a GPU, or a dedicated processor that is dedicated to specific processing. The programmable circuit is, for example, an FPGA. The dedicated circuit is, for example, an ASIC. The controller 21 executes processes related to operations of the server apparatus 20 while controlling components of the server apparatus 20.

The memory 22 includes at least one semiconductor memory, at least one magnetic memory, at least one optical memory, or any combination thereof. The semiconductor memory is, for example, RAM, ROM, or flash memory. The RAM is, for example, SRAM or DRAM. The ROM is, for example, EEPROM. The flash memory is, for example, SSD. The magnetic memory is, for example, HDD. The memory 22 functions as, for example, a main memory, an auxiliary memory, or a cache memory. The memory 22 stores data to be used for operations of the server apparatus 20 and data obtained by the operations of the server apparatus 20.

The communication interface 23 includes at least one interface for communication. The interface for communication is, for example, an interface compatible with a wired LAN communication standard such as Ethernet® or a wireless LAN communication standard such as IEEE802.11. The communication interface 23 communicates with the first terminal apparatus 30 and the plurality of second terminal apparatuses 40. The communication interface 23 receives data to be used for the operations of the server apparatus 20, and transmits data obtained by the operations of the server apparatus 20.

The functions of the server apparatus 20 are realized by execution of yet another program according to the present embodiment by a processor serving as the controller 21. That is, the functions of the server apparatus 20 are realized by software. The program causes a computer to execute the operations of the server apparatus 20, thereby causing the computer to function as the server apparatus 20. That is, the computer executes the operations of the server apparatus 20 in accordance with the program to thereby function as the server apparatus 20.

Some or all of the functions of the server apparatus 20 may be realized by a programmable circuit or a dedicated circuit serving as the controller 21. That is, some or all of the functions of the server apparatus 20 may be realized by hardware.

Operations of the communication system 10 according to the present embodiment will be described with reference to FIG. 15. These operations correspond to an education support method according to the present embodiment.

Figure 15:
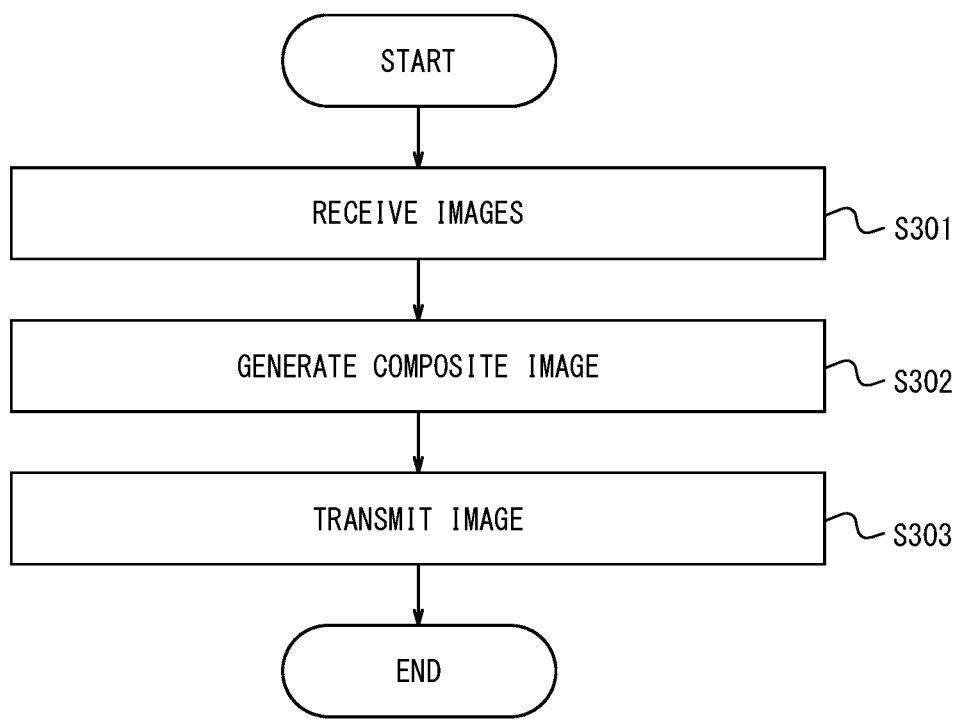
FIG. 15 is a flowchart illustrating operations of the server apparatus according to the other embodiment of the present disclosure.

FIG. 15 illustrates operations of the server apparatus 20.

The processes from step S301 to step S303 are repeated while the online education is conducted.

In step S301, the controller 21 receives, via the communication interface 23, a plurality of individual images P1 including an image H0 of the instructor U0 and an image H2 of the second student U2. Specifically, the controller 21 receives the image H0 of the instructor U0 from the first terminal apparatus 30 used by the instructor U0 via the communication interface 23. The controller 21 receives the image H2 of the second student U2 from the second terminal apparatus 40 used by the second student U2 via the communication interface 23. In the present embodiment, the plurality of individual images P1 further includes an image H3 of the third student U3, and the controller 21 receives the image H3 of the third student U3 from the second terminal apparatus 40 used by the third student U3 via the communication interface 23. The controller 21 may further receive a voice of the instructor U0 from the first terminal apparatus 30 via the communication interface 23. The controller 21 may further receive a voice of the second student U2 from the second terminal apparatus 40 used by the second student U2 via the communication interface 23. The controller 21 may further receive a voice of the third student U3 from the second terminal apparatus 40 used by the third student U3 via the communication interface 23.

In step S302, the controller 21 generates, using the plurality of individual images P1 received in step S301, a composite image M1 representing the second student U2 as being present in the same space as the instructor U0. For example, the controller 21 generates, as the composite image M1, an image displaying the instructor U0 in the middle of a screen and displaying the second student U2 at a first end of the screen, as illustrated in FIG. 5. In the present embodiment, the controller 21 generates, as the composite image M1, an image representing the second and third students U2 and U3 as being present in the same space as the instructor U0. For example, the controller 21 generates, as the composite image M1, an image displaying the third student U3 at a second end of the screen, as illustrated in FIG. 5.

In step S303, the controller 21 transmits the composite image M1 generated in step S302 to the second terminal apparatus 40 used by the first student U1 via the communication interface 23. When the voice of the instructor U0 is received from the first terminal apparatus 30 in step S301, the voice of the second student U2 is received from the second terminal apparatus 40 used by the second student U2, or the voice of the third student U3 is received from the second terminal apparatus 40 used by the third student U3, the controller 21 also transmits the received voice to the second terminal apparatus 40 used by the first student U1 via the communication interface 23.

The second terminal apparatus 40 used by the first student U1 receives the composite image M1 from the server apparatus 20 via the network 50. The second terminal apparatus 40 used by the first student U1 displays the received composite image M1 on the display. When the voice of the instructor U0, second student U2, or third student U3 is received from the server apparatus 20, the second terminal apparatus 40 used by the first student U1 outputs the received voice from the speaker.

According to the present embodiment, owing to the operations described above, it is easier for students to have the feel of being receiving instruction with other students. In other words, the students can realize the feel of being receiving group education.

Descriptions of operations of the server apparatus 20 related to screen display on the first terminal apparatus 30 and the second terminal apparatuses 40 other than the second terminal apparatus 40 used by the first student U1 are omitted.

A variation of the operations of the communication system 10 according to the present embodiment will be described with reference to FIG. 16.

FIG. 16 illustrates the operations of the server apparatus 20 when a display method is changed according to an education mode.

The processes from step S311 to step S315 are repeated while the online education is conducted. The processes in steps S311 and S313 are the same as the processes in steps S301 and S302 of FIG. 15, respectively, and thus descriptions thereof are omitted.

In Step S312, the controller 21 receives control data C0 specifying an education mode from the first terminal apparatus 30 via the communication interface 23. When the education mode specified by the received control data C0 is a group education mode, i.e., when the group education mode is selected, the process in step S313 is performed. When the education mode specified by the received control data C0 is an individual education mode, i.e., when the individual education mode is selected, the process in step S314 is performed.

In step S314, when the first student U1 receives individual instruction, the controller 21 generates an instruction image L1 displaying only the instructor U0 or only the instructor U0 and first student U1, as a different image from the composite image M1 generated in step S313. For example, the controller 21 generates, as the instruction image L1, an image displaying the instructor U0 in the middle of a screen and none of the students, as illustrated in FIG. 7. When a different student from the first student U1 receives individual instruction, the controller 21 generates a standby image W1 representing the first student U1 as being present in a different space from the instructor U0. For example, the controller 21 generates, as the standby image W1, an image similar to FIG. 9, except that the first student U1 is replaced by the second student U2, in which the second student U2 is displayed at a first end of a screen, the third student U3 is displayed at a second end of the screen, and the instructor U0 is not displayed. The controller 21 may not display a student identified by the control data C0, of the second student U2 and third student U3, so as to recognize who is receiving individual instruction. Then, the process in step S315 is performed.

In step S315, when the composite image M1 is generated in step S313, the controller 21 transmits the generated composite image M1 to the second terminal apparatus 40 used by the first student U1 via the communication interface 23. When the instruction image L1 is generated in step S314, the controller 21 transmits the generated instruction image L1 to the second terminal apparatus 40 used by the first student U1 via the communication interface 23. When the standby image W1 is generated in step S314, the controller 21 transmits the generated standby image W1 to the second terminal apparatus 40 used by the first student U1 via the communication interface 23.

The second terminal apparatus 40 used by the first student U1 receives the composite image M1, instruction image L1, or standby image W1 from the server apparatus 20 via the network 50. The second terminal apparatus 40 used by the first student U1 displays the received composite image M1, instruction image L1, or standby image W1 on the display.

According to the present embodiment, owing to the operations described above, it is easier, in the group education mode, for students to have the feel of being receiving instruction together with other students. In other words, the students can realize the feel of being receiving group education. On the other hand, in the individual education mode, it is easier for a student to have the feel of being receiving individual instruction. In other words, the student can realize the feel of being receiving individual education.

Descriptions of operations of the server apparatus 20 related to screen display on the first terminal apparatus 30 and the second terminal apparatuses 40 other than the second terminal apparatus 40 used by the first student U1 are omitted, but when the first student U1 receives individual instruction in the individual education mode, in step S314, at least a standby image W2 for the second student U2 is generated together with the instruction image L1. Then, in step S315, the standby image W2 is transmitted to the second terminal apparatus 40 used by the second student U2. On the other hand, when the second student U2 receives individual instruction in the individual education mode, an instruction image L2 for the second student U2 is generated in step S314 together with the standby image W1. Then, in step S315, the instruction image L2 is transmitted to the second terminal apparatus 40 used by the second student U2.

Examples of some embodiments of the present disclosure are described below. However, it should be noted that the embodiments of the present disclosure are not limited to these examples.

[Appendix 1] An education support apparatus configured to support online education conducted by connecting, via a network, respective terminal apparatuses used by an instructor and a plurality of students who are present in spaces separate from each other, the education support apparatus comprising:
 a communication interface configured to communicate via the network; and
 a controller configured to:
  receive, via the communication interface, a plurality of individual images including an image of the instructor and an image of a second student different from a first student among the plurality of students;
  generate, using the received plurality of individual images, a composite image representing the second student as being present in a same space as the instructor; and
  control a terminal apparatus used by the first student to display the generated composite image.

[Appendix 2] The education support apparatus according to appendix 1, wherein the controller is configured to generate, as the composite image, an image displaying the instructor in a middle of a screen and displaying the second student at a first end of the screen.

[Appendix 3] The education support apparatus according to appendix 2,
 wherein
  the plurality of individual images further includes an image of a third student different from the first student and the second student among the plurality of students, and
  the controller is configured to generate, as the composite image, an image displaying the third student at a second end of the screen.

[Appendix 4] The education support apparatus according to any one of appendices 1 to 3, wherein the controller is configured to control the terminal apparatus used by the first student to display the composite image when a group education mode in which the plurality of students receive instruction from the instructor all together is selected, and control the terminal apparatus used by the first student to display a different image from the composite image when an individual education mode in which only a specific student among the plurality of students individually receives instruction from the instructor is selected.

[Appendix 5] The education support apparatus according to appendix 4, wherein when the individual education mode is selected and the specific student is the first student, the controller is configured to:
 generate, as the different image from the composite image, an instruction image displaying only the instructor or displaying only the instructor and the first student; and
 control the terminal apparatus used by the first student to display the generated instruction image.

[Appendix 6] The education support apparatus according to appendix 4 or 5, wherein when the individual education mode is selected and the specific student is not the first student, the controller is configured to:
 generate, as the different image from the composite image, a standby image representing the first student as being present in a different space from the instructor; and
 control the terminal apparatus used by the first student to display the generated standby image.

[Appendix 7] A communication system comprising:
 the education support apparatus according to any one of appendices 1 to 6; and
 the respective terminal apparatuses used by the instructor and the plurality of students.

[Appendix 8] A program configured to cause a computer to execute operations, the computer being configured to support online education conducted by connecting, via a network, respective terminal apparatuses used by an instructor and a plurality of students who are present in spaces separate from each other, the operations comprising:
 receiving, via the network, a plurality of individual images including an image of the instructor and an image of a second student different from a first student among the plurality of students;
 generating, using the received plurality of individual images, a composite image representing the second student as being present in a same space as the instructor; and
 controlling a terminal apparatus used by the first student to display the generated composite image.

[Appendix 9] An education support method to support online education conducted by connecting, via a network, respective terminal apparatuses used by an instructor and a plurality of students who are present in spaces separate from each other, the education support method comprising:
 receiving, via the network, a plurality of individual images including an image of the instructor and an image of a second student different from a first student among the plurality of students;
 generating, using the received plurality of individual images, a composite image representing the second student as being present in a same space as the instructor; and
 controlling a terminal apparatus used by the first student to display the generated composite image.

The present disclosure is not limited to the embodiments described above. For example, two or more blocks described in the block diagrams may be integrated, or a block may be divided. Instead of executing two or more steps described in the flowcharts in chronological order in accordance with the description, the steps may be executed in parallel or in a different order according to the processing capability of the apparatus that executes each step, or as required. Other modifications can be made without departing from the spirit of the present disclosure.

The invention claimed is:

1. An education support apparatus configured to support online education conducted by connecting, via a network, respective terminal apparatuses used by an instructor and a plurality of students who are present in spaces separate from each other, the education support apparatus comprising:
    a communication interface configured to communicate via the network; and
    a controller configured to:
        receive, via the communication interface, a plurality of individual images including an image of the instructor and an image of a second student different from a first student among the plurality of students;
        control a terminal apparatus used by the first student to display the image of the instructor facing in a first direction on a screen display as though the instructor is looking at the second student;
        determine the availability of free space on the screen display;
        in response to determining there is free space on the screen display, generate, using the received plurality of individual images, a composite image representing the second student as being present in a same space as the instructor and facing in a second direction on the screen display as though the second student is looking at the instructor; and
        control the terminal apparatus used by the first student to display the generated composite image.

2. The education support apparatus according to claim 1, wherein the controller is configured to generate, as the composite image, an image displaying the instructor in a middle of the screen display and displaying the second student at a first end of the screen display.

3. The education support apparatus according to claim 2, wherein
    the plurality of individual images further includes an image of a third student different from the first student and the second student among the plurality of students, and
    the controller is configured to generate, as the composite image, an image displaying the third student at a second end of the screen display.

4. The education support apparatus according to claim 1, wherein the controller is configured to control the terminal apparatus used by the first student to display the composite image when a group education mode in which the plurality of students receive instruction from the instructor all together is selected, and control the terminal apparatus used by the first student to display a different image from the composite image when an individual education mode in which only a specific student among the plurality of students individually receives instruction from the instructor is selected.

5. The education support apparatus according to claim 4, wherein when the individual education mode is selected and the specific student is the first student, the controller is configured to:
    generate, as the different image from the composite image, an instruction image displaying only the instructor or displaying only the instructor and the first student; and
    control the terminal apparatus used by the first student to display the generated instruction image.

6. The education support apparatus according to claim 4, wherein when the individual education mode is selected and the specific student is not the first student, the controller is configured to:
    generate, as the different image from the composite image, a standby image representing the first student as being present in a different space from the instructor; and
    control the terminal apparatus used by the first student to display the generated standby image.

7. A communication system comprising:
    the education support apparatus according to claim 1; and
    the respective terminal apparatuses used by the instructor and the plurality of students.

* * * * *